United States Patent

[11] 3,619,039

| [72] | Inventor | Leo Beiser |
| | | Flushing Manor, N.Y. |
| [21] | Appl. No. | 738,234 |
| [22] | Filed | June 19, 1968 |
| [45] | Patented | Nov. 9, 1971 |
| [73] | Assignee | Columbia Broadcasting System, Inc. |
| | | New York, N.Y. |

[54] LASER SCANNING SYSTEM INCLUDING ROTATING REFLECTOR
16 Claims, 6 Drawing Figs.

[52] U.S. Cl. ................................................ 350/285, 350/7
[51] Int. Cl. .................................................. G02b 17/00
[50] Field of Search ....................................... 350/285, 289, 299, 6, 7; 178/7.6, 7.7, 6.7

[56] References Cited
UNITED STATES PATENTS

| 2,859,653 | 11/1958 | Blackstone et al. | 350/285 |
| 3,316,348 | 4/1967 | Hafnagel et al. | 178/6.7 |
| 3,469,030 | 9/1969 | Priebe | 350/285 X |
| 3,485,546 | 12/1969 | Roth | 350/285 X |
| 3,426,144 | 2/1969 | Roth | 178/6.6 |
| 3,360,659 | 12/1967 | Young | 250/236 |

Primary Examiner—Ronald L. Wibert
Assistant Examiner—V. P. McGraw
Attorney—Brumbaugh, Graves, Donohue & Raymond ABSTRACT: Collimated coherent light is passed through a lens which establishes a cone of light converging towards a first focal point. A multifaceted reflector intercepts the converging cone of light and redirects it to a scanning focal point. At the point where it is intercepted by the reflector, the cone of light is large enough in cross section to illuminate simultaneously several facets of the reflector. The reflector may have generally the shape of a cone frustum and is rotated about its axis so that the scanning focal point scans an image surface. The first focal point is on the axis, and the scanning focal point therefore describes a circular arc. The image surface is curved to conform to the arc. The collimated light travels in a direction which may be parallel to the rotor axis but which is preferably inclined to the axis in order to provide improved optical efficiency.

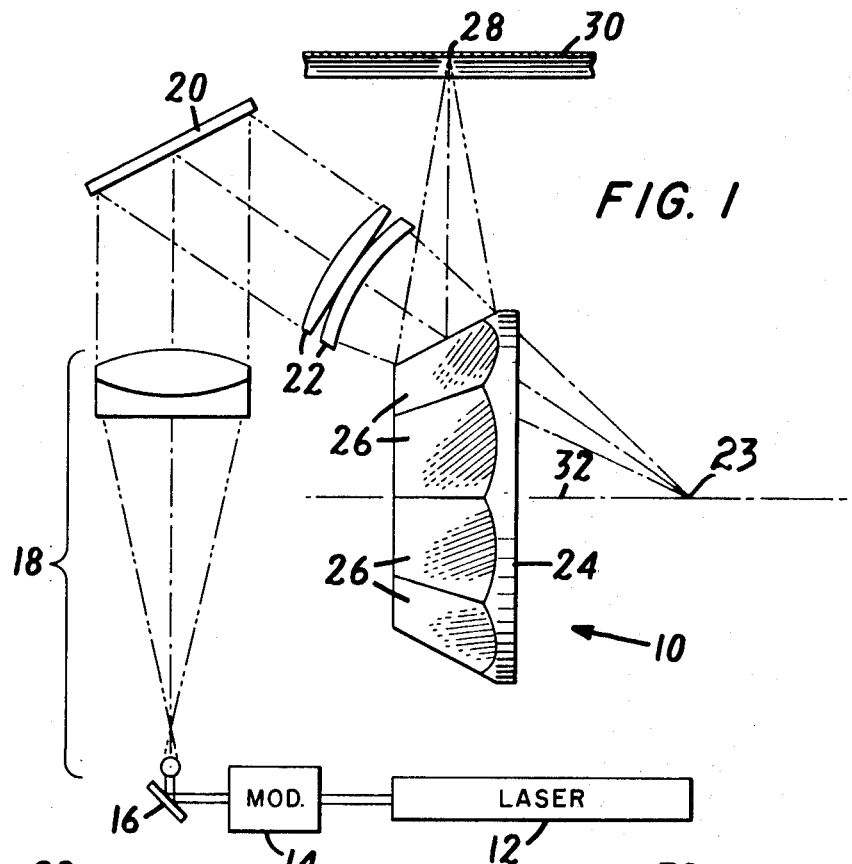
FIG. 1
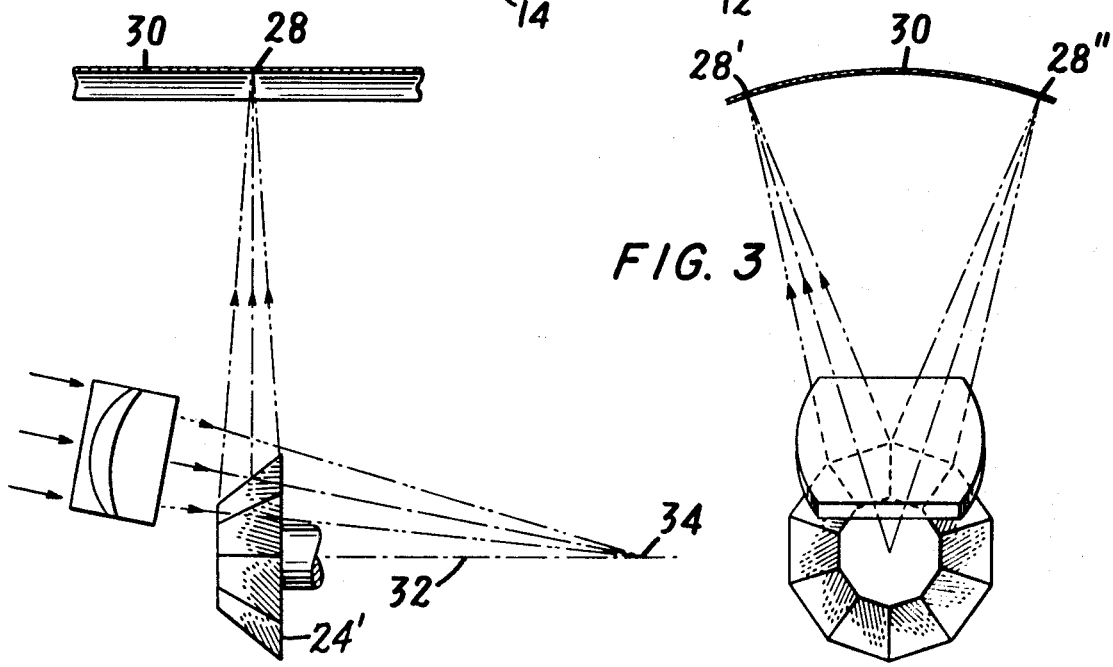
FIG. 2
FIG. 3
INVENTOR.
LEO BEISER
BY
his ATTORNEYS

INVENTOR.
LEO BEISER

LASER SCANNING SYSTEM INCLUDING ROTATING REFLECTOR

BACKGROUND OF THE INVENTION

This invention relates to scanning methods and apparatus and, more particularly, to novel and highly effective methods and apparatus facilitating high-resolution optical scanning of an image surface.

Optical scanning of an image surface by means including a multifaceted reflector that has generally the shape of cone frustum and is rotated about its axis is disclosed in a patent to Hufnagel et al. Pat. No. 3,316,348. A number of limitations characterize the prior art methods and apparatus, however. For example, only a small part of each facet surface is illuminated, and this results in low resolution due to the use of a small optical aperture. In addition, a compensating nonuniform filter is required to prevent a falling off of intensity at the edges of the scan. Further, the light impinging on the reflector is not converging, and an optical system between the reflector and the object scanned is required to bring the light to a focal point. As a result of the intervening optics, the contiguous array of scanned focal points lies in a straight line, resulting in off-axis optical aberrations.

SUMMARY OF THE INVENTION

An object of the present invention is to remedy the shortcomings of conventional methods and apparatus referred to above. In particular, an object of the invention is to provide scanning apparatus characterized by large-aperture optics facilitating high-resolution and by an absence of off-axis optical aberrations.

The foregoing and other objects of the invention are attained in a representative embodiment thereof by the provision of scanning apparatus comprising a source of collimated electromagnetic radiation, lens means for converging the radiation towards a first focal point, reflector means for redirecting the converging radiation towards a scanning focal point, and motive means for rotating the reflector about an axis, the scanning focal point scanning an image surface.

Preferably, the electromagnetic radiation is monochromatic and coherent light from a laser to provide a scanning focal point diffraction-limited in size. When the first focal point intersects the axis of the rotating reflector means, the second focal point describes a circular arc even when the incident optical axis is tilted with respect to the rotor axis.

BRIEF DESCRIPTION OF THE DRAWING

For an understanding of additional aspects of the invention, reference is made to the following detailed description of representative embodiments thereof, taken in conjunction with the accompanying figures of the drawing, in which:

FIG. 1 is a schematic view of first representative embodiment of apparatus constructed in accordance with the invention;

FIG. 2 is a schematic fragmentary view of apparatus generally according to FIG. 1;

FIG. 3 is a view of the apparatus of FIG. 2 in a plane normal to the plane of FIG. 2;

DESCRIPTION OF THE PREFERRED EMBODIMENTS

Figure 4:
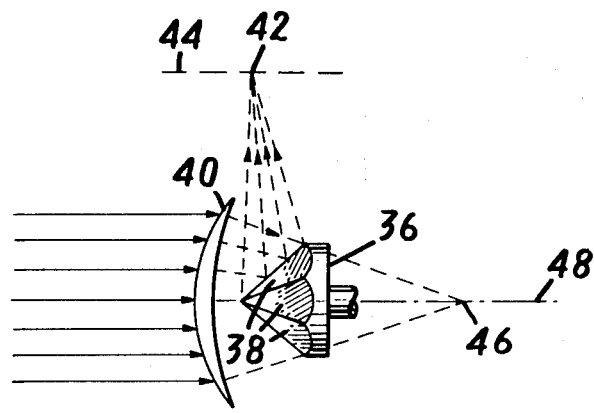
FIG. 4 is a fragmentary view of a second representative (but less general) embodiment of apparatus constructed in accordance with the invention.

FIG. 1 shows apparatus 10 constructed in accordance with the invention. The apparatus 10 includes a laser 12 for producing a beam of monochromatic and coherent light. The beam from the laser 12 passes through a light modulator 14 which modulates the intensity of the beam in accordance with information to be recorded by the apparatus 10. If it is not desired to record but instead to read out information previously recorded, the light modulator 14 is, of course, omitted, and a light sensor is arranged to collect the radiation traversing the storage medium 30.

The light passing through the modulator 14 (recording) or emanating from the laser 12 (readout) is reflected by a mirror 16 and passes through a beam expander 18 that expands and collimates the light. A mirror 20 reflects the expanded and collimated light beam to an objective lens system 22 that establishes a cone of light converging toward a first focal point (shown at 23 in FIG. 1 and shown in FIGS. 2 and 4 at 34 and 46, respectively). The mirror 16 is employed for packaging convenience, and the mirror 20 avoids interference by the apparatus with the storage medium 30. Collimation is not essential, and the optics represented at 18 and 22 may be combined for convenience on a manner well known in the art.

A multifaceted rotor or spinner 24 having a plurality of reflecting facets 26 intercepts the converging light passing through the objective lens 22 and redirects it to a scanning focal point 28 on a storage medium such as a film strip 30. The rotor or spinner 24 is mounted for rotation about an axis 32 so that the scanning focal point 28 scans the film 30.

FIGS. 2 and 3 show the nature of the scanning movement effected by the scanning focal point 28. The spinner 24' shown in these figures is functionally the same as the spinner 24 but is shown as differing slightly in details of construction. In accordance with the invention, the "original" focal point, or the focal point at which the rays of light passing through the objective lens system 22 would come to a focus but for the interposition of the spinner 24', is at a point 34 on the axis 32. Selection of the original focal point 34 on the axis 32 assures that the scanning focal point 28 is characterized by a uniform scan velocity (provided the rotational velocity of the spinner 24' is uniform) along an arc that is that is circularly curved. The scanning effected by the spinner 24' is therefore free of aberrations produced by nonuniform scan velocity, and, a circular path being a simple geometric form, the storage film 30 is readily curved so that the scanning focal point 28 is always in sharp focus on the image surface. As FIG. 3 shows, the scanning focal point 28 is in sharp focus at the left-hand portion 28' of its sweep and also at the right-end portion 28" of its sweep. The scanning focal point 28 is preferably diffraction-limited in size, and, by virtue of the on-axis performance of the objective lens system 22, this is readily achieved throughout the entire scan interval.

FIG. 4 show a spinner 36 having a plurality of reflecting facets 38 for reflecting incoming converging flux passing through an objective lens 40 to a scanning focal point 42 on image surface 44. The embodiment of FIG. 4 is like that previously described in that the "original" focal point 46 is on the axis 48 of the spinner 36. The embodiment of FIG. 4 is different from the previously described, however, in that the incoming collimated flux is parallel to the axis 48 rather than tilted with respect thereto.

Both of the embodiments of the invention described above are superior to the methods and apparatus of the prior art in providing excellent optical efficiency, in maintaining on-axis optics, in providing for a circular scan locus, and in permitting aperture truncation for isotropy. For reasons now to be developed, however, the embodiment of FIGS. 1–3 is optically more efficient than that of FIG. 4.

Figure 5:
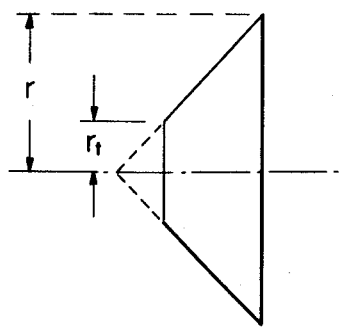
FIGS. 5 and 6 are schematic illustrations showing in side elevation and plan, respectively, the geometry of a portion of the apparatus of the invention for facilitating calculation of optical efficiency.
Figure 6:
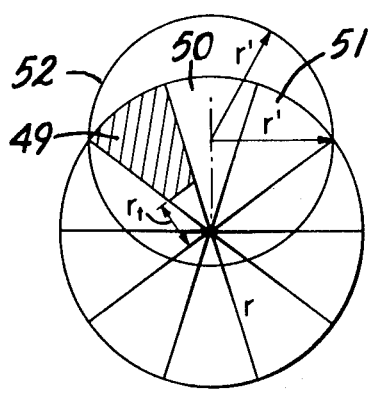

FIGS. 5 and 6 illustrate the spinner geometry and facilitate calculation of optical efficiency and lens characteristics. A representative facet 49 is one of three (the other two being facet 50 and 51) simultaneously within the input flux tube 52 and therefore simultaneously illuminated. It can be shown that the optical transfer efficiency is approximately $$\beta_1 = \frac{1-(r_i/r)^2}{N \sin^2{(n\Pi/N)}},$$

where $N$ is the total number of facets (10 in FIG. 6), $n$ is the number of facets simultaneously illuminated (3 in FIG. 6), $r$ is the spinner radius at the large base, $r̄$ is the spinner radius at the small (truncated) base, $6 < N < 12$, and $n ≤ N/2$.

Similarly, it can be shown that the optical efficiency in the case where the collimated light approaches the spinner axis at an angle (tilted-axis embodiment) exceeds the optical efficiency in the case where the collimated light approaches the spinner in a direction parallel to the spinner axis (untilted embodiment) by the factor $$\beta_2 = \frac{1}{\sin^2(n\Pi/N)}$$

Further, and more importantly, the $f$-number of the objective lens can be increased by a related factor in the tilted-axis embodiment as compared to the utilized embodiment. That is, $$\frac{f\text{-number (tilted)}}{f\text{-number (untilted)}} = \frac{1}{\sin(n\Pi/N)}.$$

For system design, the relationship between the desired effective $f$-number $F$ of the light cone from the facet (to satisfy resolution) and the $f$-number of the objective lens is $$f\text{-number (tilted)} = \frac{F \sin \Pi/N}{\sin(n\Pi/N)}.$$

Thus, there is provided in accordance with the invention novel and highly effective methods and apparatus facilitating high resolution scanning of an image surface. The invention provides on-axis optics free of off-axis distortion, circular scan locus, and aperture truncation for isotropy of characteristic of the focal point and its corresponding resolution.

The finely focused point of light is moved in such a manner that its quality (i.e., its intensity contour at the focal surface) is not perturbed by its motion. Many modifications of the representative embodiments disclosed herein will readily occur to those skilled in the art. Accordingly, the invention is to be construed as including all of the embodiments thereof within the scope of the appended claims.

I claim:

1. Scanning apparatus comprising a source of electromagnetic radiation, lens means for converging radiation from said source towards a first focal point located on a predetermined axis, reflector means rotatable about said predetermined axis and arranged to intercept and redirect said converging radiation toward a scanning focal point, and motive means for rotating said reflector means about said predetermined axis, said scanning focal point scanning a circular locus concentric with said predetermined axis.

2. Scanning apparatus according to claim 1 wherein said electromagnetic radiation is monochromatic and said reflector means is fully illuminated by said converging radiation, whereby said scanning focal point is diffraction-limited to a size inversely proportional to the size of said reflector means.

3. Scanning apparatus according to claim 1 wherein said reflector means is formed with a plurality of reflective facets at least two of which are simultaneously irradiated over their entire extent by said converging radiation and wherein aid radiation is monochromatic, whereby said scanning focal point is diffraction-limited to a size inversely proportional to the size of a corresponding facet.

4. Scanning apparatus according to claim 1 wherein the radiation from said source is directed onto said lens means along the optical axis thereof whereby said scanning focal point suffers no off-axis aberrations.

5. Scanning apparatus according to claim 1 wherein said reflector means is substantially uniformly illuminated throughout the scanning cycle whereby the resulting scanning focal point remains uniform in size and intensity throughout its useful scan.

6. Scanning apparatus according to claim 1 wherein the principal ray of said converging radiation approaches said reflector means parallel to said axis.

7. Scanning apparatus according to claim 1 wherein the principal ray of converging radiation from said lens means approaches said rotatable reflector means at a predetermined angle to said predetermined axis.

8. Scanning apparatus according to claim 1 wherein said source comprises a laser and a beam expander for producing a collimated beam of coherent, monochromatic light having a cross section to fully illuminate said lens means.

9. Scanning apparatus according to claim 1 wherein said electromagnetic radiation is monochromatic and wherein said reflector means is substantially uniformly illuminated by said converging radiation throughout the scanning cycle, whereby said scanning focal point is diffraction-limited to a size inversely proportional to the size of said reflector and remains uniform in size and intensity throughout its useful scan.

10. Scanning apparatus comprising, a source of collimated light, lens means for converging the light from said source towards a first focal point, rotatable reflector means, having an axis of rotation which includes said first focal point, positioned relative to said lens means to be fully illuminated by said converging light and operative to intercept and redirect said converging light to a small light spot at a scanning focal point, and motive means for rotating said reflector means about said axis of rotation to cause said light spot to scan a circular locus centered about said axis.

11. Scanning apparatus according to claim 10 wherein said reflector means is formed with a plurality of reflective facets, more than one of which are simultaneously illuminated over the entire extent by said converging light.

12. Scanning apparatus according to claim 10 wherein said reflector means is a spinner of pyramidal shape having a plurality of reflective facets, and said spinner is positioned on said axis of rotation with its smaller end facing said leans means.

13. Scanning apparatus according to claim 12 wherein the principal ray of said converging light approaches the reflective facets of said spinner at a predetermined angle to said axis of rotation.

14. Scanning apparatus according to claim 12 wherein the principal ray of said converging light approaches said spinner from a direction parallel to said axis of rotation.

15. A system for optically scanning a surface comprising:

a source of monochromatic electromagnetic radiation, a spinner of pyramidal shape having a plurality of reflective facets continuously rotatable about an axis extending from its base, lens means supported in the optical path of said source of radiation and operation to converge radiation from said source toward a first focal point located on said axis, said lens means being dimensioned and positioned relative to said spinner to cause the principal ray of said converging light to approach the smaller end of said spinner at a predetermined angle to said axis of rotation and to cause at least two but less than all of said reflective facets to be simultaneously illuminated over their entire extent, whereby said spinner is operative to intercept and redirect said converging radiation toward a scanning focal point displaced from said axis, and motive means for rotating said spinner about said axis, said scanning focal point being diffraction limited 40 a size inversely proportional to the size of a corresponding facet and scanning a circular locus on said surface concentric with said axis.

16. A system according to claim 15 wherein said source comprises a laser and a beam expander for producing a collimated beam of coherent, monochromatic light having a cross section to fully illuminate said lens-means.

* * * * *